(12) United States Patent
Pryor

(10) Patent No.: US 7,402,978 B2
(45) Date of Patent: Jul. 22, 2008

(54) SYSTEM AND METHOD FOR OPTIMIZING GRID CHARGING OF AN ELECTRIC/HYBRID VEHICLE

(75) Inventor: Bryan K. Pryor, Pontiac, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 36 days.

(21) Appl. No.: 11/428,056

(22) Filed: Jun. 30, 2006

(65) Prior Publication Data

US 2008/0007202 A1    Jan. 10, 2008

(51) Int. Cl.
*H01M 10/46* (2006.01)
(52) U.S. Cl. ..................................... 320/104
(58) Field of Classification Search .......... 320/107, 320/104, 114, 109
See application file for complete search history.

(56) References Cited

U.S. PATENT DOCUMENTS 4,052,655 A * 10/1977 Vizza .......................... 320/109
6,614,204 B2 * 9/2003 Pellegrino et al. ........... 320/109

* cited by examiner

*Primary Examiner*—Edward Tso

(57) ABSTRACT

A vehicular charging system is provided that may be deployed on a vehicle configured to be charged from an external power source. The vehicular charging system comprises a battery assembly and a timer coupled to the battery assembly. The timer is configured to electrically couple the external power source to the battery assembly to commence charging the battery assembly at a predetermined charge initialization time.

15 Claims, 4 Drawing Sheets

SYSTEM AND METHOD FOR OPTIMIZING GRID CHARGING OF AN ELECTRIC/HYBRID VEHICLE

TECHNICAL FIELD

The present invention generally relates to electric/hybrid vehicles and, more particularly, to a method and apparatus for optimizing the charging time of an electric/hybrid vehicle.

BACKGROUND OF THE INVENTION

In a battery-powered electric vehicle (BEV), an electric motor/generator is powered by a group of batteries configured as a battery pack or assembly that may be recharged from an external electrical source (e.g., the national power grid). The BEV's electric motor/generator exhibits certain advantages over the well-known internal combustion engine utilized by conventional vehicles. For example, an electric motor achieves significantly higher conversion efficiency and is capable of producing torque without vehicular movement thus eliminating the need for gearboxes and torque converters. Additionally, an electric motor has the ability to recapture kinetic energy via regenerative breakings. Furthermore, an electric motor significantly reduces emission during operation. Despite the advantages associated with electric motors, however, BEVs have not been widely adopted, largely because of limitations associated with cost and performance (e.g., range).

Hybrid vehicles, like BEVs, employ battery-powered electric motors; however, hybrid vehicles do so in combination with highly efficient heat engines, such as conventional internal combustion engines. By selectively utilizing the electric motor (e.g., when the vehicle is at a standstill), the hybrid vehicle minimizes reliance on the internal combustion engine thus conserving petroleum fuel, minimizing emissions, and reducing operational costs. Recently, plug-in hybrid electrical vehicles (PHEVs) have been developed that employ rechargeable, high-capacity battery assemblies that permit the electric motor to operate for a longer period of time thus reducing reliance on the internal combustion engine. For short range trips, a PHEV may rely solely on the electric motor thereby avoiding the use of the internal combustion engine entirely.

BEVs and PHEVs are generally provided with a connector capable that is electrically coupled to the battery assembly and that may be manually connected to an external power source (e.g., the power grid) to permit battery assembly recharging. For example, the connector cable may include a pronged end that may be plugged into a household electrical outlet. Charging time may range from minutes to several hours depending upon the extent to which the battery assembly has been depleted and the voltage/frequency of the outlet. The time of day (TOD) during which the BEV/PHEV charges is important for two primary reasons: (1) in the aggregate, the charging TOD impacts power grid stress levels; and (2) the charging TOD often determines the cost per kilowatt-hour that a consumer pays for electricity.

It should thus be appreciated that it would be desirable to provide a vehicular charging system capable of (1) determining an optimal time period during which the battery assembly of an electric/hybrid vehicle should be charged and (2) effectuating charging during the determined time period. Other desirable features and characteristics of the present invention will become apparent from the subsequent detailed description and the appended claims, taken in conjunction with the accompanying drawings and the foregoing technical field and background.

SUMMARY OF THE INVENTION

A vehicular charging system is provided that may be deployed on a vehicle configured to be charged from an external power source. The vehicular charging system comprises a battery assembly and a timer coupled to the battery assembly. The timer is configured to electrically couple the external power source to the battery assembly to commence charging the battery assembly at a predetermined charge initialization time.

A method for selecting the charging time of a vehicular battery assembly from an external power source is also provided. The battery assembly is deployed on a vehicle including a processor and a memory. The method comprises storing a predetermined charge initialization time in the memory, monitoring the current time with the processor, recalling the predetermined charge initialization time from the memory, and commencing charging of the battery assembly when the current time reaches the predetermined charge initialization time.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
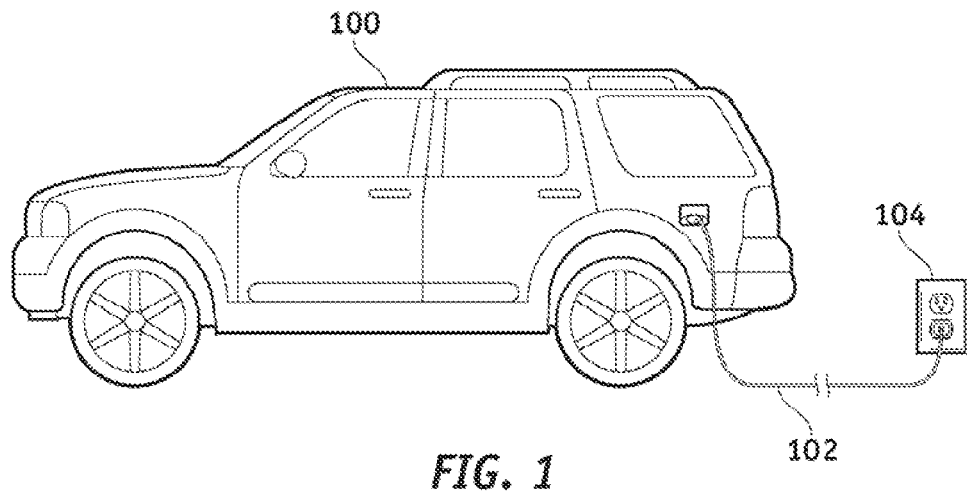
FIG. 1 is an isometric view of a hybrid vehicle including a connector cable plugged into an external outlet.

FIG. 1 is an isometric view of a vehicle 100, such as a battery-powered electric vehicle or plug-in hybrid electric vehicle. Vehicle 100 is at least partially powered by an onboard battery assembly that may be recharged by connecting a connector cable 102 to an external power source. For example, connector cable 102 may include a pronged end configured to be plugged into a common electrical outlet 104, which is coupled to the national power grid (e.g., to one of the three main power grid interconnections extending across the 48 contiguous states). In accordance with the present invention, vehicle 100 is equipped with a vehicular charging system that may determine an optimal charge initialization time (CIT) and commence charging of vehicle 100 in accordance with the determined CIT.

Figure 2:
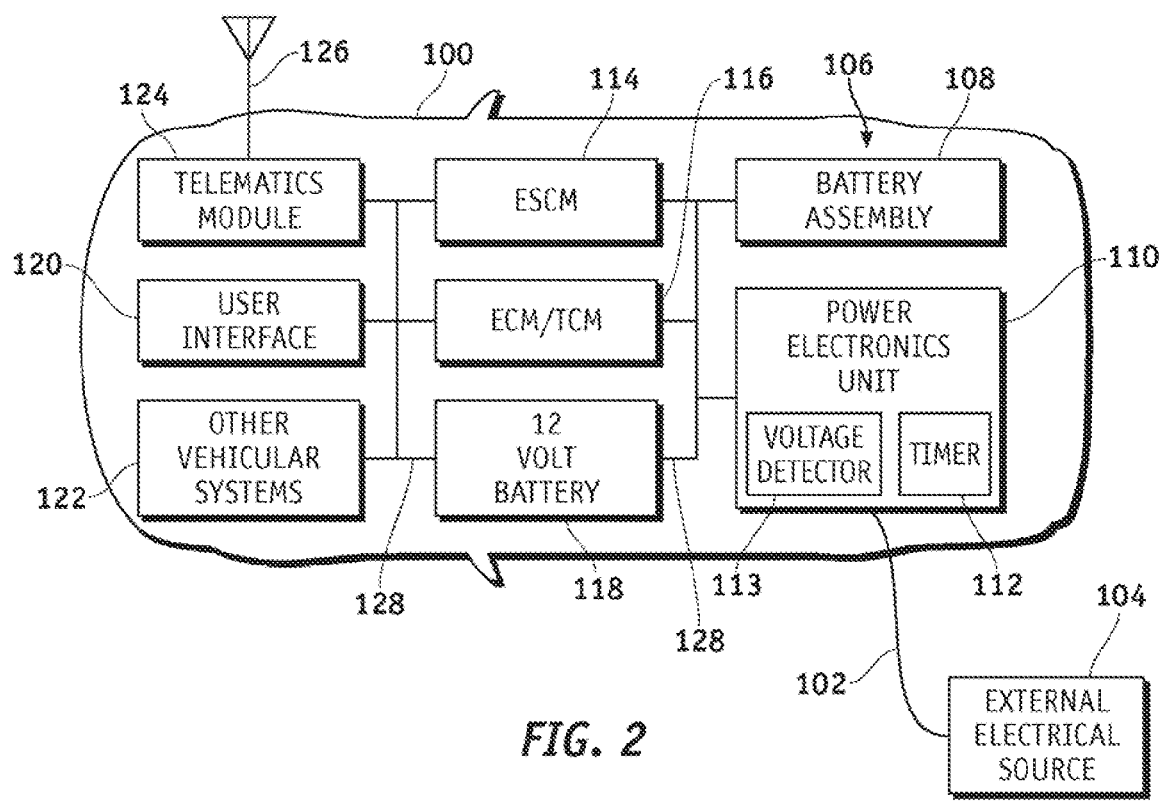
FIG. 2 is a functional block diagram of a vehicular charging system deployed on the vehicle shown in FIG. 1 in accordance with an exemplary embodiment of the present invention.

FIG. 2 is a functional view of an exemplary vehicular charging system 106 deployed on vehicle 100. Vehicular charging system 106 includes a hybrid battery assembly 108 comprising multiple batteries, at least one of which has a rechargeable chemistry (e.g., nickel metal hydride, lithium ion, etc.). A power electronics unit 110, which includes a timer 112 (e.g., a processor), is coupled between battery assembly 108 and connector cable 102. Power electronics unit 110 may also include a voltage detector 113 for determining when connector cable 102 is connected to an external electrical source, such as electrical source 104. As will be more fully described below, power electronics unit 110 may control the charging of battery assembly 108 by selectively coupling external electrical source 104 to battery assembly 108 through connector cable 102. An energy storage control module (ESCM) 114 is also coupled to battery assembly 108 and power electronics unit 110. ESCM 114 monitors various operational parameters of battery assembly 108 (e.g., voltage, current, temperature, and/or charge level).

Vehicular charging system 106 may also include additional components, such as an engine control module/transmission control module (ECM/TCM) 116, a conventional 12-volt battery 118, a user interface 120, and various other vehicular systems 122 typically deployed on a motor vehicle (e.g., ABS, HVAC, etc.). In certain embodiments, vehicular charging system 106 may be provided with a transceiver to enable wireless communication over a communications network (e.g., a mobile phone network, a satellite network, etc.). For example, vehicular charging system 106 may include telematics module 124 (e.g., Onstar) having an antenna 126. Telematics module 124 may also be capable of tracking the position of vehicle 100 through global positioning system technology. A plurality of connections 128 (e.g., serial data buses) electrically couple the components of vehicular charging system 106. Collectively, connections 128 may comprise a controller area network utilizing standard communication protocols (e.g., J1850 type protocols).

User interface 120 may comprise a user input (e.g., controls associated with a driver information center, an audio system, the vehicle's trip input button or stem, etc.) configured to receive user selection data so as to permit customization of the charging process. For example, user interface 120 may allow a user to select between different charge modes; e.g., a STANDARD CHARGE MODE wherein charging commences regardless of the time of day and an ECONOMY CHARGE MODE wherein charging commences at the predetermined charge initialization time (CIT). Interface 120 may also include a feedback generator (e.g., a sound generator or display, such as a head-up display or a center stack display) configured to indicate user selections (e.g., the selected mode).

Figure 3:
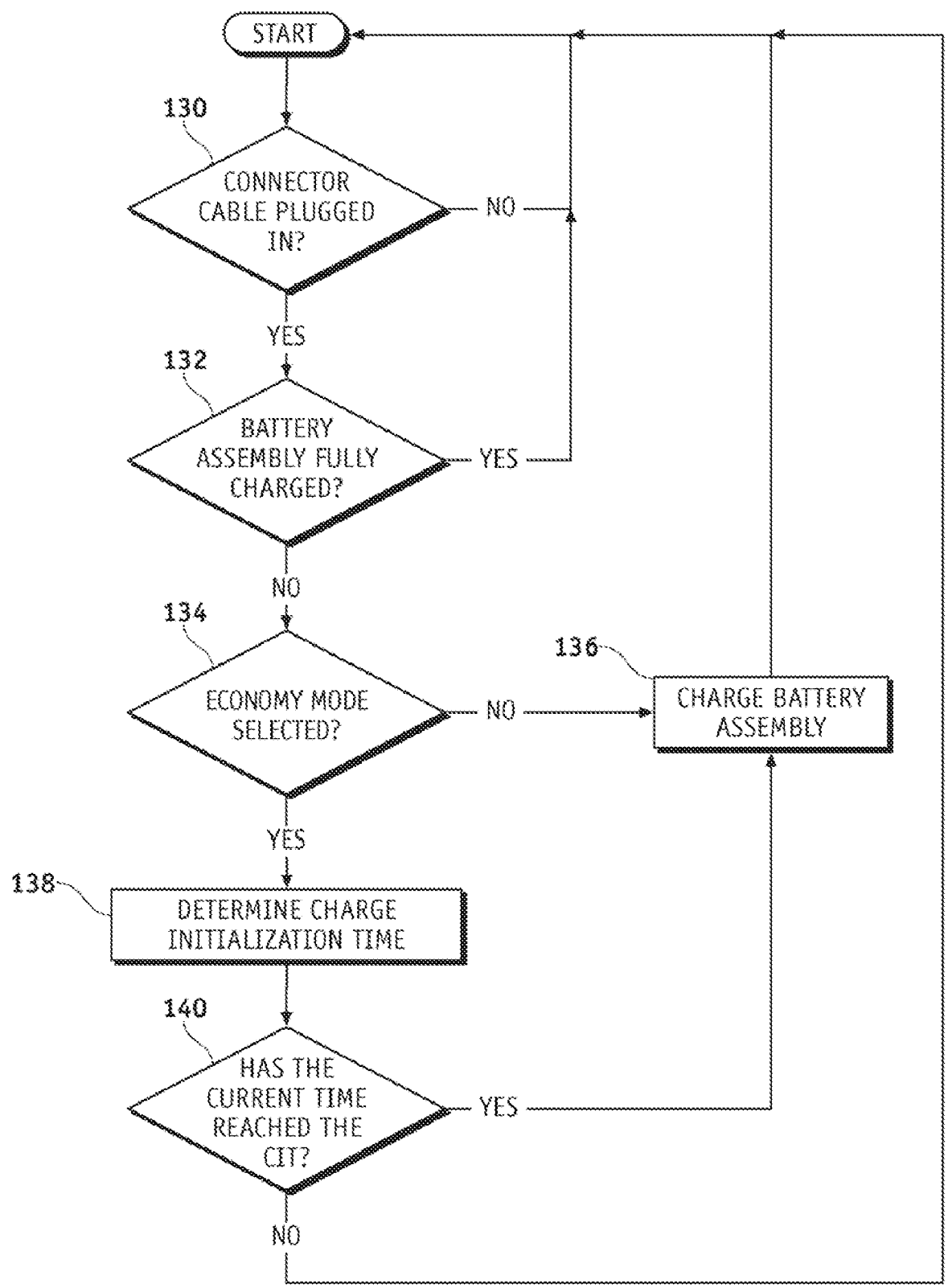
FIG. 3 is a flowchart illustrating an exemplary charge initialization process that may be performed by the vehicular charging system shown in FIG. 2.

FIG. 3 is a flowchart illustrating an exemplary charge initiation process that may be performed by vehicular charging system 106. To begin, power electronics unit 110 determines whether connector cable 102 has been connected to external electrical source 104 as indicated by, for example, a detector (e.g., voltage detector 113) coupled to cable 102 (STEP 130). If it is determined that connector cable 102 is coupled to electrical source 104, power electronics unit 110 interrogates ESCM 114 to determine if battery assembly 108 is fully charged (STEP 132). If battery assembly 108 is not fully charged, power electronics unit 110 then determines whether a user has selected the ECONOMY CHARGE MODE as describe above (STEP 134). If the ECONOMY CHARGE MODE has not been selected, power electronics unit 110 commences charging battery assembly 108 (STEP 136). Charging continues until connector cable 102 is disconnected (STEP 130) or battery assembly 108 is fully charged (STEP 132).

If unit 110 instead determines that the ECONOMY CHARGE MODE has been selected (STEP 134), power electronics unit 110 establishes the appropriate CIT (STEP 138) utilizing any one of a number of techniques. For example, power electronics unit 110 may simply recall the CIT from an onboard memory. In this case, the CIT may be a pre-programmed time stored in an onboard memory that typically designates the beginning of a low stress period for the power grid (e.g., 10:00 pm). Alternatively, the CIT may have been pre-selected by a user (e.g., a driver) utilizing user interface 120. After establishing the CIT, power electronics unit 110 compares the CIT to the current time of day. If the current time is earlier than the CIT, power electronics unit 110 returns to STEP 130. However, if the current time has reached the CIT, power electronics unit 110 commences charging of battery assembly 108 (STEP 136). Charging of battery assembly 108 continues until connector cable 102 is disconnected (STEP 130) or battery assembly 108 is fully charged (STEP 132).

In contrast to recalling a pre-programmed or user-selected CIT from an onboard memory, power electronics unit 110 may instead be configured to establish a CIT by reference to external source data communicated to unit 110 by way of telematics module 124. The external source data may be indicative of various parameters of vehicle 100 and/or local power grid stress levels. For example, the external source data may provide information indicative of the current location of vehicle 100. Power electronics unit 110 may utilize the current location of vehicle 100 to determine a corresponding CIT by, for example, reference to a two dimensional look-up table associating a plurality of geographic locations with a plurality of location-specific CITs. Alternatively, power electronics unit 110 may utilize the current location of vehicle 100 to identify the time zone in which vehicle 100 currently resides. After identifying the correct time zone, power electronic unit 110 may simply initiate charging at a pre-programmed or user-selected time as described above in conjunction with STEP 138 and STEP 140 (FIG. 3). In this manner, vehicular charging system 106 may be configured to automatically compensate for changes in time due to travel through multiple time zones and/or daylight savings.

Figure 4:
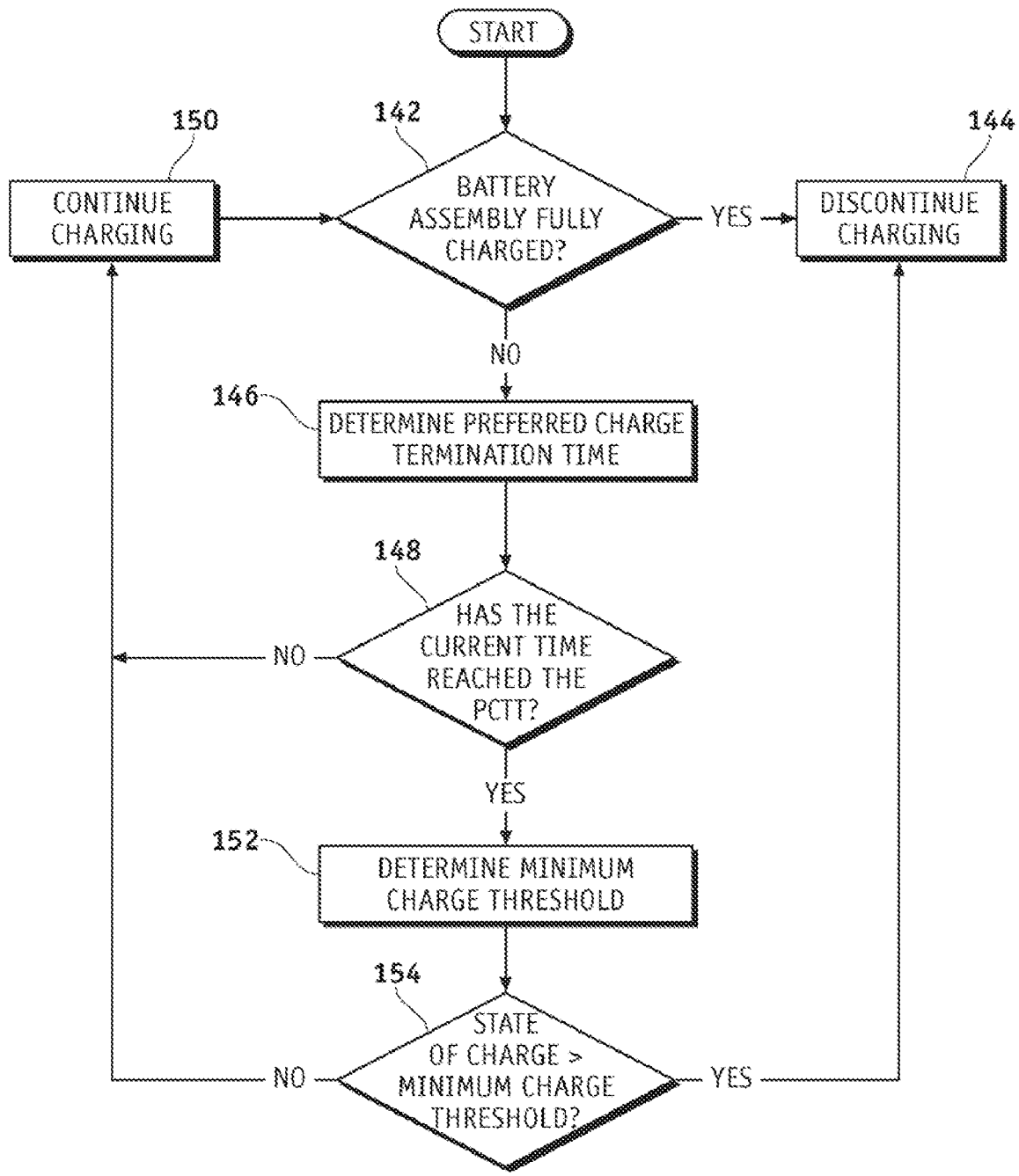
FIG. 4 is a flowchart illustrating an exemplary charge termination process that may be performed by the vehicular charging system shown in FIG. 2.

Vehicular charging system 100 may be configured to terminate charging in accordance with user preferences. FIG. 4 is a flowchart illustrating an exemplary charge termination processes that may be carried out by vehicular charging system 100. If desired, the charge termination process shown in FIG. 4 may be performed in conjunction with a charge initiation process similar to that described above in conjunction with FIG. 3. Power electronics unit 110 first determines if battery assembly 108 is fully charged by, for example, interrogating ESCM 114 in the previously described manner (STEP 142). If battery assembly 108 is fully charged, charging is discontinued (STEP 144). If, instead, battery assembly 108 is not fully charged, power electronics unit 110 determines a preferred charge termination time or PCTT (STEP 146). Similar to the charge initialization time, the PCTT may be pre-programmed, previously selected by user utilizing user interface 120, or determined in relation to external source data. After establishing the PCTT, power electronics unit 110 compares the PCTT to the current time. If power electronics unit 110 determines that the current time is earlier than the PCTT (STEP 148), charging continues (STEP 150).

If it is determined that the current time has reached the PCTT (STEP 148), power electronics unit 110 determines a minimum charge threshold (STEP 152); for example, in the same manner as the PCTT is determined (e.g., through a user selection process performed with user interface 120). If the charge level of battery assembly 108 is less than or equal to the minimum charge threshold (STEP 154), charging continues (STEP 150). In contrast, if it is determined that the charge level of battery assembly 108 is greater than the minimum charge threshold (STEP 154), power electronics unit 110 terminates the charging process (STEP 144).

Figure 5:
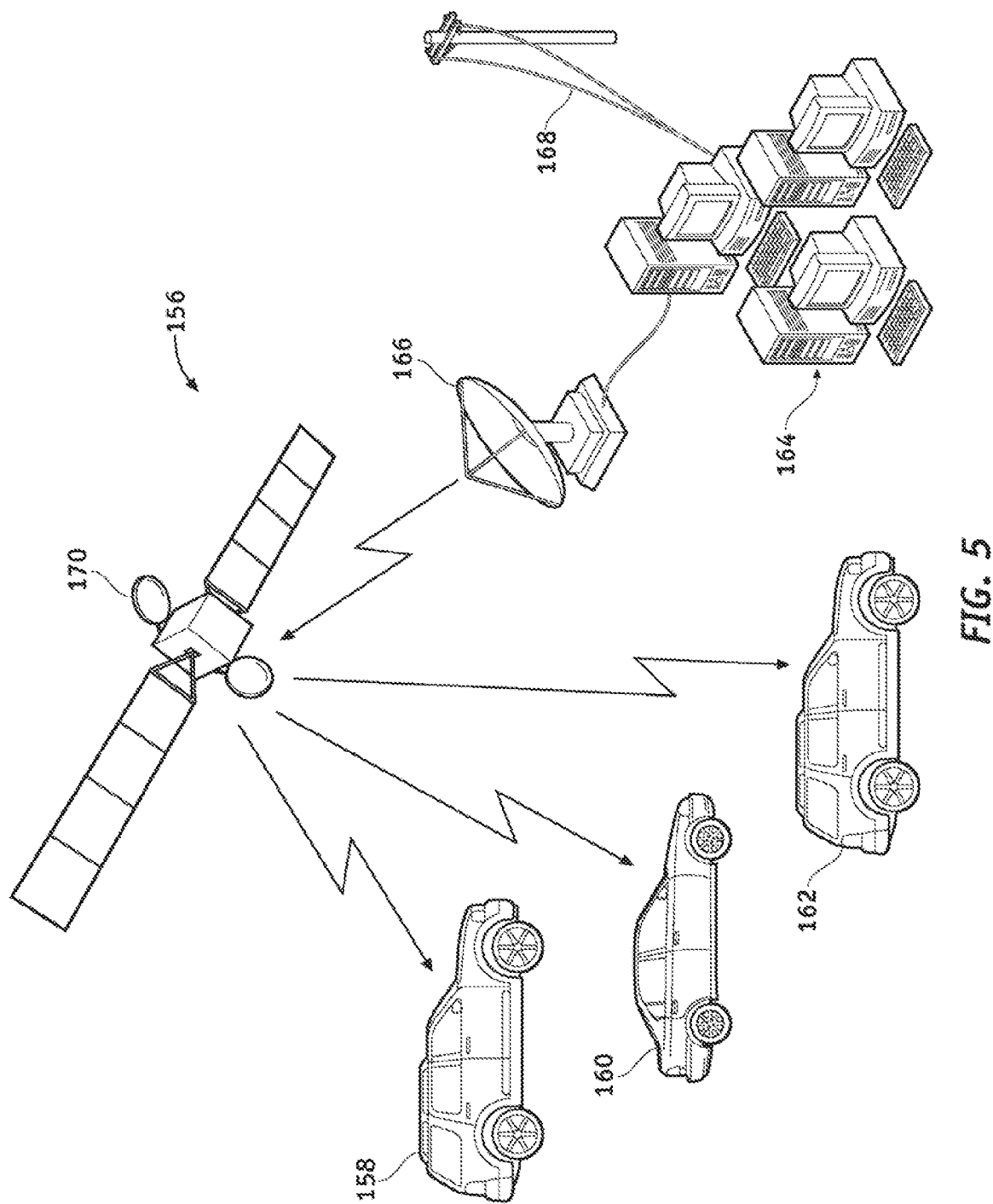
FIG. 5 is a functional view of a fleet charging management system configured to coordinate the charging of a plurality of vehicles each having a vehicular charging system deployed thereon.

In contrast to recalling a stored CIT from an onboard memory or establishing a CIT from external source data as described above, power electronics unit 110 may be configured to receive an assigned CIT from a central controller, which may be, for example, employed in a fleet charging management system. FIG. 5 is a functional view of an exemplary fleet charging management system 156 configured to coordinate the charging of a plurality of vehicles (e.g., vehicles 158, 160, and 162) each having a vehicular charging system deployed thereon (e.g., system 106 shown in FIG. 2). Fleet charging management system 156 comprises a central controller 164 coupled to a power grid monitor 168 (e.g., an area operator, a grid substation, a GPS satellite, etc.) configured to monitor voltage and current levels at critical power grid junctures. Controller 164 is also coupled to a wireless transceiver 166, which may comprise, for example, a satellite dish. Satellite dish 166 cooperates with a satellite 170 to enable bi-directional communication between controller 164 and vehicles 158, 160, and 162.

Fleet charging management system 156 may coordinate the charging of vehicle 158, 160, and 162 to help offset peak power grid stress levels. In particular, controller 164 may assign an optimal charge initialization time (CIT) to each vehicle in the following manner. To begin, controller 164 may take an inventory of the number of vehicles awaiting recharge by, for example, querying each vehicle's vehicular charging system. Alternatively, each of the vehicular charging systems may be configured to transmit a signal indicating a pending charging cycle at a certain point in the pre-charging process. Referring briefly to FIGS. 2 and 3, this may be accomplished by configuring power electronics unit 110 to emit a signal via telematics module 124 after determining that ECONOMY MODE has been selected (STEP 134). After taking an inventory of the vehicles awaiting recharge, controller 164 next establishes a time period wherein the regional power grid experiences relatively little stress. Controller 164 then determines and assigns vehicle-specific CITs to evenly distribute vehicular charging over this time period. For example, if determining that the power grid experienced relatively little stress during the hours of 10:00 pm and 4:00 am, controller 164 may assign a charge initialization time of 10:00 pm to vehicle 158, 12:00 am to vehicle 160, and 2:00 am to vehicle 162.

The vehicular charging systems deployed on vehicles 158, 160, and 162 may also be configured to transmit additional data indicative of estimated charge time duration. For example, the vehicular charging systems may transmit to controller 164 the current charge level of the battery assembly and/or the duration of past charging cycles. As will be appreciated by one skilled in the art, controller 164 may utilize such information to more accurately determine optimal charge time distribution.

It should thus be appreciated that a vehicular charging system has been provided that is capable of (1) determining an optimal time period during which the battery assembly of a hybrid/electric vehicle should be charged and (2) effectuating charging during the determined time period. Although generally described above in conjunction with a plug-in electric hybrid vehicle, it should be understood that the inventive vehicular charging system may be deployed on a battery-powered electric vehicle or any other vehicle comprising at least one onboard battery rechargeable from an external power source.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any manner. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicular charging system deployed on a vehicle configured to be charged from an external power source, the vehicular charging system configured to communicate with the central controller of a fleet charging management system, the vehicular charging system comprising:
    a battery assembly;
    a memory configured to store a predetermined charge initialization time;
    a transceiver deployed on the vehicle; and
    a processor coupled to said battery assembly, to said transceiver, and to said memory, said processor configured to: (i) establish the predetermined charge initialization time utilizing data received via said transceiver and provided by the central controller, and (ii) electrically couple the external power source to said battery assembly to commence charging said battery assembly at the predetermined charge initialization time.

2. A vehicular charging system according to claim 1 further comprising a user interface coupled to said processor, said user interface configured to permit adjustment of the charge initialization time.

3. A vehicular charging system according to claim 1 further comprising:
    a cable configured to be coupled to the external power source; and
    a detector coupled to said cable and to said processor to detect when said cable is connected to the external power source, wherein said processor is configured to commence charging said battery assembly when the predetermined charge initialization time is reached and when said detector indicates that said cable is coupled to the external power source.

4. A vehicular charging system according to claim 1 further comprising a sensor coupled to said battery assembly and configured to determine the charge level of said battery assembly, said processor configured to commence charging of said battery assembly when the predetermined charge initialization time is reached and when said sensor indicates that the charge level of said battery assembly is below a predetermined threshold.

5. A vehicular charging system deployed on a vehicle configured to be charged from an external power source, the vehicular charging system comprising:
    a battery assembly;

a control module deployed on the vehicle and coupled to said battery assembly that monitors the charge level of said battery assembly;

a memory configured to store a predetermined charge initialization time, a predetermined charge termination time, and a minimum charge threshold; and a processor coupled to said battery assembly, to said memory, and to said control module, said processor configured to: (i) commence charging said battery assembly when the charge level of said battery assembly is at least partially depleted and when the predetermined charge initialization time is reached, and (ii) terminate charging said battery assembly when the current time has reached the predetermined charge termination time and the charge level of said battery assembly is greater than the minimum charge threshold.

6. A vehicular charging system according to claim 5 further comprising a telematics module coupled to said processor, said processor configured to receive data from said telematics module indicative of the location of the vehicle.

7. A vehicular charging system according to claim 5 further comprising:

a cable configured to be coupled to the external power source; and a detector coupled to said cable and to said processor to detect when said cable is connected to the external power source, wherein said processor is configured to commence charging said battery assembly when (1) the charge level of said battery assembly is at least partially depleted, (2) a predetermined charge initialization time is reached, and (3) said detector indicates that said cable is coupled to the external power source.

8. A vehicular charging system according to claim 5 further comprising a user interface coupled to said processor, said user interface configured to permit user selection of a charge mode.

9. A vehicular charging system according to claim 5 wherein said control module comprises an energy storage control module coupled to said battery assembly and configured to monitor operational parameters of said battery assembly.

10. A method for charging a battery assembly from an external power source, the battery assembly deployed on a vehicle including a processor, a user interface, and a memory, the method comprising:

storing a predetermined charge initialization time in the memory;

monitoring the current time with the processor;

receiving user input via the user interface selecting between an economy charge mode and a standard charge mode;

when the battery assembly is connected to the external power source and the standard charge mode is selected, immediately commencing charging of the battery assembly; and when the battery assembly is connected to the external power source and the economy charge mode is selected, commencing charging of the battery assembly only after the current time reaches the predetermined charge initialization time.

11. A method according to claim 10 wherein the vehicle includes a sensor coupled to the processor and to the battery assembly for determining the charge level of the battery assembly, the method further comprising commencing charging of the battery assembly when the current time reaches the predetermined charge initialization time and when the sensor indicates that the charge level of the battery assembly is depleted below a predetermined threshold.

12. A method according to claim 10 further comprising receiving user input from the user interface indicative of a desired charge initialization time.

13. A method according to claim 10 wherein the vehicle further comprises a transceiver coupled to the processor, the method further comprising determining the charge initialization time from external source data received via the transceiver.

14. A method according to claim 10 wherein the external source data comprises an assigned charge initialization time.

15. A method according to claim 10 further comprising storing a predetermined charge termination time in the memory.

* * * * *